R. W. LEDBETTER.
REPAIR COUPLING FOR AIR HOSE.
APPLICATION FILED SEPT. 11, 1915.

1,166,059.

Patented Dec. 28, 1915.

Witness
J. Gordon Sparkes.

Inventor
R. W. Ledbetter
By Roff. S. Johnston Jr.
Attorney

UNITED STATES PATENT OFFICE.

RALPH W. LEDBETTER, OF BIRMINGHAM, ALABAMA.

REPAIR-COUPLING FOR AIR-HOSE.

1,166,059.　　　　　　　Specification of Letters Patent.　　　Patented Dec. 28, 1915.

Application filed September 11, 1915. Serial No. 50,266.

*To all whom it may concern:*

Be it known that I, RALPH W. LEDBETTER, a citizen of the United States of America, residing at Birmingham, in the county of Jefferson and State of Alabama, have invented certain new and useful Improvements in Repair-Couplings for Air-Hose, of which the following is a specification.

My invention relates to couplings for repairing air hose and is particularly designed for repairing air hose of the type used in street railway cars.

The object of my invention is to design a repair coupling which is very cheap and easy to manufacture and which provides an exceedingly reliable and satisfactory means for connecting the parted ends of the air hose so as to afford a joint which will hold against any ordinary conditions of use.

I have found that where the coupling is given an external diameter which is substantially greater than that of the internal diameter of the hose, the latter will grip the coupling throughout and afford a particularly effective joint, especially where the coupling is cast so as to provide it with a roughened exterior due to the sand pits, etc. I have also found that where a retaining shoulder is used, if it is set substantially mid-way of each half portion of the coupling, the bending or flexing pull of the hose is kept sufficiently away from the shoulder and the tendency of the hose to creep or be worked off is materially reduced and this is particularly true when the end portion of the sleeve beyond the shoulder is of larger diameter than the normal internal diameter of the hose. I have also found that it is important to avoid shaping the shoulder as to cut the hose and at the same time adapting it to afford an effective grip on the hose and to this end I have designed the shoulder with a gradual slope facing the adjacent end of the coupling and merging into a rounded top from which an abrupt shoulder leads back to the cylindrical middle surface of the coupling.

I have illustrated my invention in its preferred form in the accompanying drawings, in which:—

Figure 2:
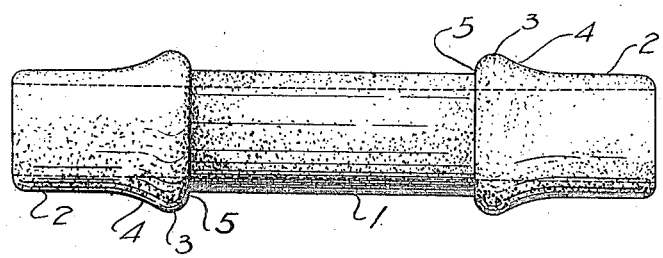
Figure 1:
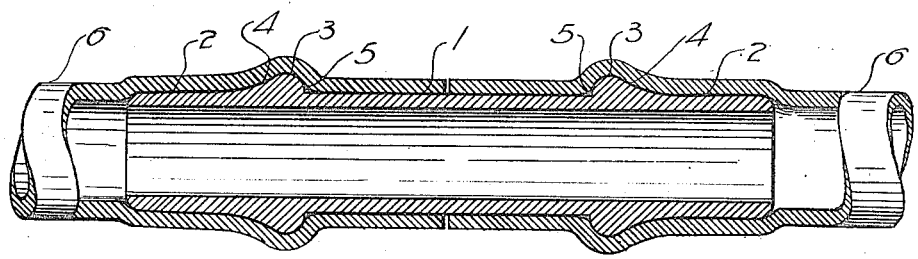
Figure 3:
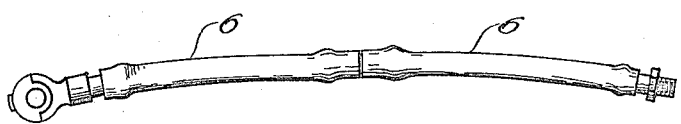

Figure 1 shows the coupling in longitudinal cross section mounted in operating position in a hose. Fig. 2 is a side elevation of the coupling. Fig. 3 shows an air hose after being mended.

Similar reference numerals refer to similar parts throughout the drawings.

The repair coupling is preferably formed as a casting having a cylindrical middle portion 1 and cylindrical end portions 2 which are separated from the middle portion by raised annular shoulders 3, which shoulders are rounded overhead and have their faces 4 inclined gradually toward the outer ends of the coupling and having their faces 5 inclined sharply toward the middle portion 1 of the coupling. The external diameters of the parts 1 and 2 are preferably uniform and are substantially greater than the internal diameter of the air hose 6, the breaks in which the coupling is intended to be repaired. It will also be noted that the shoulders 3 are each arranged substantially half way between the center and ends of the coupling, thus affording approximately equal stretches of coupling surface for engagement with each end of the hose. The external surface of the coupling is preferably roughened by the use of coarse sand in the molds and by natural sand pits formed in ordinary rough castings, and this, in addition to its larger diameter and the shoulders, affords a very firm and reliable interlock with the ends of the hose. I am enabled to dispense with clamp rings and other devices which are commonly used with repair couplings and by setting the shoulders 3 well away from the ends of the coupling these ends stiffen the hose for a substantial distance from the shoulders and prevent its tendency to creep as it swings back and forth in flexed position. This trouble has necessitated the use of clamp bands and sharp retaining edges on the shoulders in other couplings, but these are objectionable in that they rapidly cut through the hose.

Having thus described my invention, what I claim as new and desire to secure by Letters Patent, is:—

A repair coupling for air hose comprising a tubular casting having a roughened exterior surface, the pipe receiving ends of the casting being increased in diameter until substantially raised shoulders are provided above the periphery of the intermediate section, each of said shoulders being sharply rounded over on a short radius curve until it joins the intermediate portion of the casting, said intermediate portion of the casting having an external diameter substantially greater than the internal diameter of the hose to be repaired, and said shoulders being spaced substantially from each other and from the ends of the coupling, substantially as described.

In testimony whereof I affix my signature.

RALPH W. LEDBETTER.

Witness:
   NOMIE WELSH.